US012151821B2

(12) United States Patent
Galzin et al.

(10) Patent No.: US 12,151,821 B2
(45) Date of Patent: Nov. 26, 2024

(54) AIR CONDITIONING SYSTEM FOR A CABIN OF AN AIR OR RAIL TRANSPORT VEHICLE USING A PNEUMATIC AND THERMAL AIR SOURCE WHICH IS SEPARATE FROM THE AIR CONDITIONING SOURCE

(71) Applicant: LIEBHERR-AEROSPACE TOULOUSE SAS, Toulouse (FR)

(72) Inventors: Guillaume Galzin, Toulouse (FR); Adrien Bonhomme, Toulouse (FR); Frédéric Sanchez, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 274 days.

(21) Appl. No.: 17/778,391

(22) PCT Filed: Nov. 18, 2020

(86) PCT No.: PCT/FR2020/052104
§ 371 (c)(1),
(2) Date: May 19, 2022

(87) PCT Pub. No.: WO2021/099733
PCT Pub. Date: May 27, 2021

(65) Prior Publication Data
US 2023/0002063 A1 Jan. 5, 2023

(30) Foreign Application Priority Data
Nov. 19, 2019 (FR) ........................ 1912897

(51) Int. Cl.
*B64D 13/00* (2006.01)
*B64D 13/06* (2006.01)
*B64D 11/06* (2006.01)

(52) U.S. Cl.
CPC .............. *B64D 13/06* (2013.01); *B64D 11/06* (2013.01); *B64D 2013/0618* (2013.01); *B64D 2013/0648* (2013.01)

(58) Field of Classification Search
CPC .................... B64D 13/06; B64D 11/06; B64D 2013/0618; B64D 2013/0648; B64D 2013/0662; Y02T 30/00; Y02T 50/50
See application file for complete search history.

(56) References Cited

U.S. PATENT DOCUMENTS 6,199,387 B1 * 3/2001 Sauterleute ............ B64D 13/06
62/87
11,926,422 B2 * 3/2024 Ho ........................ B64D 13/06
(Continued)

FOREIGN PATENT DOCUMENTS

| EP | 2998223 A1 | 3/2016 |
| EP | 3312091 A1 | 4/2018 |
| EP | 3480113 A1 | 5/2019 |

*Primary Examiner* — Phutthiwat Wongwian
*Assistant Examiner* — Sherman D Manley
(74) *Attorney, Agent, or Firm* — CRGO Global; Steven M. Greenberg (57) ABSTRACT

The invention relates to an air conditioning system for a cabin (10) of an aircraft (80) comprising: a bleed air source (12); a ram-air circulation channel (13); a network of pipes and control valves; an air cycle turbine engine comprising at least one compressor (3) and a power turbine (4) which are mechanically connected to one another; and at least one primary cooling exchanger (PHX) which is accommodated in said channel (13), characterized in that said pipe network comprises a thermal power pipe (53) which is suitable for being able to fluidically connect, upon control of at least one control valve (25, 21), said air outlet (4b) of said power turbine (4) and said ram-air circulation channel (13) upstream of said primary exchanger (PHX) so that said bleed air expanded by said power turbine (4) can form a
(Continued)

thermal energy source for said ram air being supplied to said primary circuit of said primary exchanger (PHX).

13 Claims, 2 Drawing Sheets

(56) References Cited

U.S. PATENT DOCUMENTS

| | | | |
|---|---|---|---|
| 2017/0341759 A1* | 11/2017 | Bruno | B64D 13/06 |
| 2018/0215473 A1* | 8/2018 | Army | B64D 13/04 |
| 2019/0135440 A1* | 5/2019 | Bruno | B64D 13/06 |
| 2020/0391870 A1* | 12/2020 | Bruno | B64D 13/08 |
| 2022/0033093 A1* | 2/2022 | Bruno | B64D 13/08 |
| 2023/0074116 A1* | 3/2023 | Ho | B60H 1/3211 |

* cited by examiner

AIR CONDITIONING SYSTEM FOR A CABIN OF AN AIR OR RAIL TRANSPORT VEHICLE USING A PNEUMATIC AND THERMAL AIR SOURCE WHICH IS SEPARATE FROM THE AIR CONDITIONING SOURCE

CROSS-REFERENCE TO RELATED APPLICATIONS

This application is a § 371 national phase entry of International Application No. PCT/FR2020/052104, filed Nov. 18, 2020, which claims priority to French Patent Application No. 1912897 filed on Nov. 19, 2019.

TECHNICAL FIELD OF THE INVENTION

The invention relates to an air conditioning system for a cabin of an air or rail transport vehicle. The invention relates more particularly to an air conditioning system for a cabin of an air or rail transport vehicle using a hot and pressurized air source as a pneumatic and thermal energy source and mainly using outside air as an air conditioning source, that is to say as an air source which is intended to be supplied to the cabin.

TECHNICAL BACKGROUND

Throughout the text, the term "cabin" denotes any interior space of an air or rail transport vehicle of which the pressure and/or temperature of the air must be controlled. This may be a cabin for passengers, the pilot's cockpit, a hold, and in general any area of the transport vehicle which requires air to be at a controlled pressure and/or temperature. This air at a controlled pressure and/or temperature is supplied by an air conditioning system.

Usually, an air conditioning system for a cabin of a transport vehicle such as an aircraft (also referred to throughout the text as an air conditioning pack) comprises a device for bleeding compressed air, better known as bleed air, from at least one compressor of an aircraft engine (such as a propulsion engine or an auxiliary engine of the aircraft), an air cycle turbine engine comprising at least one compressor and a turbine which are mechanically coupled to one another, said compressor comprising an air inlet which is connected to said compressed bleed air device and an air outlet, and said turbine comprising an air inlet and an air outlet which are connected to said cabin in order to be able to supply it with air at a controlled pressure and temperature.

A conventional air conditioning system also comprises heat exchangers which are accommodated in a channel for circulating ram air drawn from outside the aircraft. Throughout the following text, the concept of ram air refers to air drawn from outside the aircraft by all types of known means, such as a scoop or a low-drag air inlet, also known as a flush/NACA inlet.

It is also common for the air cycle turbine engine to carry, on its shaft, a fan which extends into the ram-air circulation channel to provide air circulation therein for the purpose of cooling the bleed air and the air compressed by the compressor of the turbine engine.

In other words, a conventional air conditioning system uses bleed air as a thermal, pneumatic and conditioning energy source, that is to say fresh air intended to be supplied to the cabin.

The general problem which has arisen for some time with this type of air conditioning system is how to minimize bleeding air from compressors of the engines, so as in turn to minimize the impact of this air bleed on kerosene consumption and on engine performance. Another problem consists in being able to control the temperature and pressure in the cabin during all the operating phases of the aircraft, including during take-off, landing and on the ground.

Finally, another problem lies in the fact that the bleed air, bled from a compressor of a propulsion engine of the aircraft, forms the air conditioning source such that contamination of the air bled from the engines is transmitted to the cabin, which can be dangerous for the health of passengers in particular.

To overcome this disadvantage of the risk of contaminating the air conditioning, a more electrical solution has already been proposed which consists in using, as an air conditioning source, ram air drawn from outside the aircraft. In other words, according to this solution, the compressor of the air cycle turbine engine is rotated by an electric motor and is directly supplied with the ambient air drawn from outside the aircraft. This compressed air is then cooled by the heat exchangers and expanded by the turbine of the turbine engine before being supplied to the cabin. This solution is interesting but requires high electrical power to rotate the compressor.

The inventors have therefore sought to propose a new design for an air conditioning system for a cabin of a rail or air transport vehicle which makes it possible to overcome the various disadvantages of the various currently known solutions.

AIMS OF THE INVENTION

The invention aims to provide an air conditioning system for the cabin of a transport vehicle, such as an aircraft, which makes it possible to limit the risk of contaminating the conditioning air which is supplied to the cabin while eliminating the need to resort to an electric drive of the compressor of the turbine engine.

The invention also aims to provide, in at least one embodiment of the invention, an air conditioning system for a cabin of an aircraft which has different operating modes depending on the flight conditions of the aircraft.

DISCLOSURE OF THE INVENTION

To this end, the invention relates to an air conditioning system for a cabin of an air or rail transport vehicle, comprising:
   a hot and pressurized air source, referred to as a bleed air source,
   a channel for circulating ram air drawn from outside the transport vehicle,
   a network of pipes and control valves which are configured to be able to control the flow of air circulating through said pipes on the basis of the conditions of use of the transport vehicle,
   an air cycle turbine engine comprising at least one compressor and a turbine, referred to as a power turbine, which are mechanically connected to one another, said compressor comprising an air inlet which is fluidically connected to an opening for drawing in outside air and an air outlet which is suitable for being able to be fluidically connected by said pipe network, upon control of at least one control valve, to said cabin in order to be able to supply it with air at a controlled pressure and temperature, and said power turbine comprising an air inlet which is suitable for being able to be fluidically connected by said pipe network, upon control of at least one control valve, to said bleed air source and an air outlet, at least one heat exchanger, referred to as a primary cooling exchanger, which is accommodated in said ram-air circulation channel and comprises a primary circuit supplied with the flow of air from said compressor in thermal interaction with a secondary circuit supplied with said ram air.

The air conditioning system according to the invention is characterized in that said pipe network further comprises a pipe, referred to as a thermal power pipe, which is suitable for being able to fluidically connect, upon control of at least one control valve, said outlet of said power turbine and said ram-air circulation channel upstream of said primary exchanger such that said bleed air expanded by said power turbine can form a thermal energy source for said ram air being supplied to said primary circuit of said primary exchanger.

An air conditioning system according to the invention makes it possible in an unprecedented way to use a bleed air source, which is for example air bled from a propulsion engine of the transport vehicle such as an aircraft, both as a pneumatic energy source for rotating the air cycle turbine engine, and as a thermal energy source for modifying the temperature of the air of the ram-air circulation channel upstream of the primary cooling exchanger, also referred to throughout the application by the acronym PHX for Primary Heat Exchanger.

An air bleed system according to the invention thus makes it possible to give the primary cooling exchanger the function of heat exchanger, better known as intercooler, which makes it possible to reduce the temperature of the compressed air to increase its density.

In addition, according to the conditions of use of the transport vehicle (that is to say according to the flight conditions when the transport vehicle is an aircraft), the supply of cold power upstream of the cold pass of the primary exchanger which results from the expansion of the bleed air by the power turbine makes it possible to reduce the flow of ram air which is required for cooling the air conditioning pack, and therefore reduce the drag of the transport vehicle.

In other words, and if the system according to the invention is provided in an aircraft, said system contributes to reducing the drag of the aircraft by limiting the need to draw ram air from outside the aircraft.

According to an alternative embodiment of the invention, the thermal pipe opens to the outlet of the primary circuit of the primary exchanger, that is to say at the outlet of the hot pass of the heat exchanger. This alternative makes it possible to optimize heat exchanges between the primary and secondary circuits of the exchanger and optimize thermal stratification. In other words, said alternative makes it possible to lower the temperature of the air at the outlet of the hot pass when the air conditioning pack is cold (that is to say when it is in cooling mode) and to raise the temperature of the air at the outlet of the hot pass when the pack is hot (that is to say when it is in heating mode).

Advantageously and according to the invention, the air conditioning system further comprises at least a second heat exchanger, referred to as the main cooling exchanger, which is arranged in said ram-air circulation channel upstream of said thermal power pipe and comprises a primary circuit supplied with said flow of air from said primary circuit of said primary exchanger in thermal interaction with a secondary circuit supplied with said ram air.

According to this alternative, the air conditioning system can have a cooling mode during which the hot air supplied by the compressor is cooled successively by the PHX and the MHX, and is then conveyed to the cabin (after possibly passing through a water extraction loop and other devices of the air conditioning system).

Advantageously and according to this alternative, said pipe network further comprises a bypass pipe which is suitable for being able to fluidically connect, upon control of at least one control valve, the outlet of the primary circuit of said primary cooling exchanger and the pipe network downstream of said main cooling exchanger so as to bypass said main cooling exchanger.

According to this alternative, the air conditioning system can have a heating mode during which the air supplied by the compressor heats up through the PHX (the cold pass being supplied with hot air from the power turbine). This air is then directed to the hot outlet of the MHX via the bypass pipe such that the air bypasses the exchanger MHX in order to reach the outlet of the air conditioning pack without being subjected to cooling by the exchanger MHX. This therefore makes it possible to inject conditioned hot air into the cabin.

Advantageously and according to the invention, said control valves are controlled in order to make possible at least the following operating modes:

an operating mode, referred to as a routine mode, in which said inlet of said power turbine is supplied with said bleed air source in order to be able to rotate said compressor supplied with air drawn from outside the transport vehicle, and said air outlet of said power turbine supplies said ram-air channel with expanded bleed air, an operating mode, referred to as an emergency mode, in which said bleed air source is supplied directly to said cabin after cooling by said heat exchangers accommodated in the ram-air circulation channel, without passing through the air cycle turbine engine, an operating mode, referred to as an intermediate mode, in which said inlet of said power turbine is supplied with said bleed air source in order to be able to rotate said compressor supplied with air drawn from outside the transport vehicle, and said air compressed by said compressor is mixed with the bleed air expanded by said power turbine upstream of the primary circuit of the primary cooling exchanger or with bleed air directly from said bleed air source.

An air conditioning system according to this advantageous alternative thus makes it possible to present at least three operating modes—routine, emergency and intermediate—on the basis of the conditions of use of the air or rail transport vehicle.

In particular, in the routine mode, the air supplied to the cabin is exclusively fresh air drawn from outside the transport vehicle and the bleed air is used solely as a pneumatic energy source for driving the compressor of the turbine engine and as a thermal energy source (for cooling or heating) as needed.

In the emergency mode, the bleed air is used as an air conditioning source, as a pneumatic energy source and as a thermal energy source. This mode makes it possible to overcome a possible failure of the air cycle turbine engine by allowing the turbine engine to be bypassed and the cabin to be supplied directly with bleed air cooled by the exchangers PHX and MHX accommodated in the ram-air circulation channel.

Finally, in the intermediate mode, the bleed air can be mixed with the outside air compressed by the compressor of the turbine engine. This intermediate mode makes it possible in particular to reduce the energy consumption of the air conditioning pack. In this intermediate operating mode, the bleed air mixed with the air compressed by the compressor can be either the bleed air directly from the bleed air source, or the bleed air expanded by the power turbine, or a mixture of both.

Advantageously and according to the invention, the system further comprises a turbofan which is arranged in said ram-air circulation channel downstream of said primary exchanger and is suitable for being able to be connected by said pipe network, upon control of at least one control valve, to said bleed air source.

According to this alternative, the air circulation in the ram-air circulation channel is provided by a turbofan supplied with the bleed air. According to another alternative, the turbine engine may comprise a fan mounted on the shaft which mechanically connects the power turbine engine and the compressor.

Advantageously and according to the invention, said air cycle turbine engine further comprises:
- at least a second turbine which is mechanically connected to said compressor and to said power turbine, said second expansion turbine comprising at least a first air inlet which is suitable for being able to be fluidically connected by said pipe network, upon control of at least one control valve, to said main cooling exchanger and an air outlet which is suitable for being able to be fluidically connected by said pipe network, upon control of at least one control valve, to said cabin,
- a water extraction loop arranged between said main cooling exchanger and said second turbine so as to be able to extract the water present in the air fed by said main cooling exchanger before being fed to this second expansion turbine.

According to this advantageous alternative, the system comprises a water extraction loop and at least a second turbine mounted on the shaft of the turbine engine.

Advantageously and according to the invention, said second expansion turbine comprises at least a second air inlet which is suitable for being able to be fluidically connected by said pipe network, upon control of at least one control valve, to an air outlet of said cabin, referred to as a recovery air outlet, such that this recovery air discharged from said cabin (10) can form a pneumatic energy source for driving said second turbine.

This advantageous alternative makes it possible to recover the air discharged from the cabin in order to provide an additional pneumatic energy source, thus making it possible to limit the need for bleed air in order to for the compressor to be driven via the power turbine. In other words, the second turbine participates in driving the compressor by using the recovery air as an additional pneumatic energy source.

Advantageously and according to the invention, the system further comprises at least one heat exchanger, referred to as an intercooler, comprising a primary circuit which is suitable for being able to be fluidically connected by said pipe network, upon control of at least one control valve, to said recovery air outlet of said cabin and to said second inlet of said second expansion turbine, in thermal interaction with a secondary circuit which is suitable for being able to be fluidically connected by said pipe network to said air outlet of said compressor and to said primary cooling exchanger or to said pipe network downstream of said main cooling exchanger.

This advantageous alternative combines the various advantages already discussed and also makes it possible, due to the presence of the intercooler, to cool the outlet of air compressed by the compressor. In particular, in flight, the supply of cold power upstream of the cold pass of the primary exchanger by the power turbine makes it possible to reduce the flow of ram air required for cooling the pack and consequently the drag of the transport vehicle. In addition, the cabin air, rejected by the pressurization system, is favorably directed through the intercooler in order to cool the outlet of the compressor (thermal recovery of cabin energy). This heated air is then expanded to the external pressure through the second turbine, the mechanical energy produced contributing favorably to the drive of the air cycle turbine engine (recovery of the pneumatic energy of the cabin). The cold air from the turbine is favorably injected into the cold pass of the MHX in order to contribute to its cooling and reduce the need for ram air (and therefore the drag of the aircraft if the system is provided in an aircraft).

Advantageously and according to the invention, the air cycle turbine engine further comprises at least one third turbine which is mechanically connected to said compressor, to said power turbine and to said second expansion turbine, said third turbine comprising a first air inlet which is suitable for being able to be fluidically connected by said pipe network, upon control of at least one control valve, to said air outlet of said second turbine and an air outlet which is suitable for being able to be fluidically connected by said pipe network, upon control of at least one control valve, to said cabin.

According to this advantageous alternative, the air cycle turbine engine is a 4-wheel machine consisting of a compressor and three turbines, including a power turbine.

Advantageously and according to this alternative, said third expansion turbine comprises at least a second air inlet which is suitable for being able to be fluidically connected by said pipe network, upon control of at least one control valve, to said recovery air outlet such that this recovery air discharged from said cabin can form a pneumatic energy source for driving said third turbine.

In other words, according to this alternative, said second and third expansion turbines each comprise at least a second air inlet which is suitable for being able to be fluidically connected by said pipe network, upon control of at least one control valve, to said recovery air outlet so that this recovery air discharged from said cabin can form a pneumatic energy source for driving said second and third turbines. The second and third turbines thus participate in driving the compressor by using the recovery air as an additional pneumatic energy source.

If the system comprises two expansion turbines in addition to the power turbine, said intercooler advantageously comprises a primary circuit which is suitable for being able to be fluidically connected by said pipe network, upon control of at least one control valve, to said recovery air outlet of said cabin and to said second inlets of said second and third expansion turbines, in thermal interaction with a secondary circuit which is suitable for being able to be fluidically connected by said pipe network to said air outlet of said compressor and to said primary cooling exchanger or to said pipe network downstream of said main cooling exchanger.

According to this advantageous alternative, the supply of cold power upstream of the cold pass of the primary exchanger by the power turbine makes it possible (depending on the conditions of use of the vehicle, that is to say when an aircraft is in flight) to reduce the flow of ram air required for cooling the pack and consequently the drag of the transport vehicle. In addition, the cabin air, rejected by the pressurization system, is favorably directed through the intercooler in order to cool the outlet of the compressor (thermal recovery of cabin energy). This heated air is then expanded to the external pressure through the second and third turbines, the mechanical energy produced contributing favorably to the drive of the air cycle turbine engine (recovery of the pneumatic energy of the cabin). The cold air from the turbines is favorably injected into the cold pass of the MHX in order to contribute to its cooling and reduce the need for ram air (and therefore the drag of the aircraft if the system is provided in an aircraft).

The invention also relates to an aircraft comprising a cabin, characterized in that it also comprises an air conditioning system according to the invention, said air conditioning system supplying said cabin of the aircraft with conditioned air.

The advantages and technical effects of an air conditioning system according to the invention apply, mutatis mutandis, to an aircraft according to the invention.

The invention also relates to a method for air conditioning a cabin of an air or rail transport vehicle comprising a hot and pressurized air source, referred to as a bleed air source, a fresh outside air source, a channel for circulating ram air drawn from outside the aircraft, a cooling exchanger, referred to as a primary exchanger (PHX), which is accommodated in said ram-air circulation channel, a cooling exchanger, referred to as a main exchanger (MHX), which is accommodated in said ram-air circulation channel, an air cycle turbine engine comprising at least one compressor and a power turbine which are mechanically connected to one another, and a network of pipes and control valves.

A method according to the invention is characterized in that it comprises the following steps:
- the bleed air is conveyed to said power turbine in order to make it possible for said compressor to be driven by said power turbine,
- the fresh outside air is supplied to said compressor in order for said air to be compressed by said compressor,
- the air compressed by said compressor is conveyed by said pipe network to said primary cooling exchanger, then to said cabin after passing at least through a water extraction loop if the conditions of use of the vehicle so require,
- the bleed air expanded by said power turbine is conveyed, on the basis of the conditions of use, either to the ram-air circulation channel upstream of the primary cooling exchanger, or to a manifold for mixing said bleed air with the air from said compressor, or directly to said cabin bypassing said main cooling exchanger.

Thus, the advantages and technical effects of an air conditioning system according to the invention apply, mutatis mutandis, to an air conditioning method according to the invention.

A method according to the invention is advantageously implemented by an air conditioning system according to the invention and an air conditioning system according to the invention advantageously implements a method according to the invention.

Advantageously and according to the invention, the method further comprises a step consisting in conveying air discharged from the cabin, referred to as recovery air, to an inlet of at least one turbine which is mechanically connected to said compressor and to said power turbine so as to form a pneumatic energy source for driving the air cycle turbine engine.

The invention also relates to an air conditioning system for a cabin of a transport vehicle such as an aircraft, to an aircraft and to a method for air conditioning a cabin of a transport vehicle such as an aircraft, characterized in combination by all or some of the features mentioned above or below.

LIST OF FIGURES

Further aims, features and advantages of the invention will become apparent upon reading the following description, which is provided solely by way of non-limiting example, and which refers to the accompanying drawings, in which.

DETAILED DESCRIPTION OF AN EMBODIMENT OF THE INVENTION

For the sake of illustration and clarity, scales and proportions are not strictly adhered to in the drawings. Moreover, identical, similar, or analogous elements are denoted using the same reference signs throughout the drawings.

Figure 1:
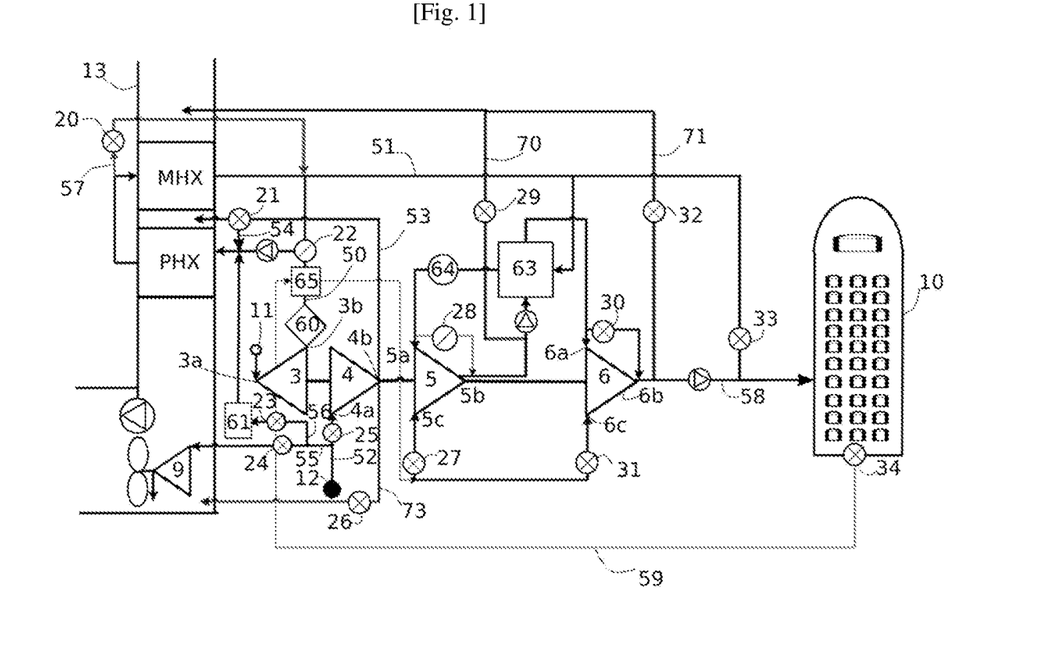
FIG. 1 is a schematic view of an air conditioning system in accordance with one embodiment of the invention.

FIG. 1 describes an air conditioning system for a cabin 10 of an aircraft, comprising a fresh air source 11, a hot pressurized air source, referred to as bleed air 12, a channel 13 for circulating ram air drawn from outside the aircraft, and a network of pipe and control valves 20, 21, 22, 23, 24, 25, 26, 27, 28, 29, 30, 31, 32, 33, 34 which are configured so as to be able to control the flow of air circulating through the pipes on the basis of the flight conditions of the aircraft.

The bleed air source 12 is for example air bled from a propulsion engine of the aircraft.

The air conditioning system according to the invention also comprises an air cycle turbine engine comprising a compressor 3, a power turbine 4, a second turbine 5 and a third turbine 6 which are mechanically connected to one another by a mechanical shaft.

The system further comprises a primary cooling exchanger PHX and a main cooling exchanger MHX which are accommodated in the ram-air circulation channel 13.

The compressor 3 comprises an air inlet 3a which is fluidically connected to the fresh air source 11 and an air outlet 3b which is fluidically connected to a heat exchanger PHX by a pipe 50 of the pipe network. This pipe 50 is provided with a control valve 22 which makes it possible to control the flow of air being supplied to the exchanger PHX. This pipe is also provided according to the embodiment of FIG. 1 with an ozone converter 60.

On the basis of controlling the control valve 22, the air from the compressor either is supplied to the primary exchanger circuit PHX, or reaches a pipe 51 which fluidically connects the main cooling exchanger MHX and the cabin 10 (possibly after passing through a water extraction loop described below). This pipe 51 is provided with an altitude valve 33 such that in flight, above a predetermined altitude, the air from the exchanger MHX can be injected directly into the cabin 10.

The power turbine 4, which is mechanically connected to the compressor 3, comprises an air inlet 4a which is fluidically connected to the bleed air source 12 via a pipe 52 that is provided with the control valve 25. The power turbine also comprises an air outlet 4b which is fluidly connected to the channel 13 by a pipe 53 which opens into the channel between the exchangers PHX and MHX. This pipe 53 is provided with the control valve 21. This control valve 21 makes it possible to modulate the quantity of expanded bleed air mixed with the compressed air from the compressor 3. Indeed, if this control valve 21 is partially opened, a portion of the bleed air expanded by the turbine 4 is directed through the pipe 54 in order to be mixed with the air from the pipe 50.

Upstream of the control valve 25, the system further comprises a pipe 55 that is provided with a control valve 24 which makes it possible to supply a turbofan 9 accommodated in the channel 12. This turbofan has the function of moving ram air into the channel 13.

This pipe 55 further comprises a bypass to a pipe 56 that is provided with the control valve 23 in order to be able to directly supply the exchanger PHX and thus bypass the turbine engine and supply, in the event of an emergency, the cabin with bleed air cooled by the exchangers PHX and MHX. This pipe 56 is further provided with an ozone converter 61.

The outlet of the power turbine can also be fluidically connected to the channel 13 downstream of the exchangers MHX and PHX by the pipe 73 that is provided with the control valve 26.

The system also comprises a pipe 57 that is provided with the control valve 20 and makes it possible to fluidically connect the outlet of the exchanger PHX and the outlet of the exchanger MHX if the control valve 20 is opened. This feature makes it possible that in the heating mode, the air from the compressor is heated through the PHX (the cold pass of the exchanger being supplied with the hot air from the power turbine 3), bypasses the exchanger MHX (so as not to be cooled by this exchanger) by the pipe 57 in order to then be able to be supplied to the cabin directly (by opening the altitude valve 33).

If the control valve 20 closes, which corresponds to a cooling mode, the air from the primary circuit of the exchanger PHX is directed to the primary circuit of the exchanger MHX so as to be subjected to cooling there, then moves toward the cabin, after passing through a water extraction loop and the expansion turbines 5 and 6.

The water extraction loop is formed by a condenser 63 and a water separator 64. The operation of such a water extraction loop is known and is not explained here in detail. The air dried by the water extraction loop is expanded by the turbine 5 which comprises a first air inlet 5a supplied with the dried air from the water separator 64 and an air outlet 5b which is connected to the air inlet 6a of the third expansion turbine 6. The third expansion turbine also comprises an air inlet 6a and an air outlet 6b which are fluidly connected to the cabin by a pipe 58.

The air conditioning system also comprises a cabin energy recovery circuit comprising a pipe 59 which connects an air outlet provided with the cabin provided with the control valve 34 and the inlets 5c and 6c of the turbines 5 and 6. Thus, the air recovered from the cabin is used to supply a surplus of pneumatic energy which is intended to drive the turbine engine. This recirculation circuit further comprises an intercooler-like heat exchanger 65, which provides heat exchanges between the recovery air which circulates in the pipe 59 and the compressed air from the compressor 3 which circulates in the pipe 50.

The system also comprises pipes 70, 71 that are each provided with a control valve 29, 32 and make it possible to fluidically connect the outlet of the turbines 5, 6 and the ram-air recirculation channel 13. Thus, the air expanded by the turbines 5 and 6 can be favorably injected into the cold pass of the exchangers MHX and PHX in order to participate in the cooling of the air, which contributes to reducing the need for ram air, and consequently to reducing aircraft drag.

An air conditioning system according to the invention thus makes it possible, by control of the control valves 20, 21, 22, 23, 24, 25, 26, 27, 28, 29, 30, 31, 32, 33, 34 associated with the pipes 50, 51, 52, 53, 54, 55, 56, 57, 58, 59, 71, 72, to have at least one of the following operating modes:

an operating mode, referred to as a routine mode, in which said inlet of said power turbine 4a is supplied with said bleed air source 12 in order to be able to rotate said compressor 3 supplied with the fresh air source 11, and said air outlet 4b of said power turbine 4 supplies said ram-air channel 12 with expanded bleed air. In this operating mode, the air compressed by the compressor 3 is either directly injected into the cabin 10 via the pipe 57 (if the system is in heating mode), or cooled by the exchanger MHX, then directed to the water extraction loop and the turbines 5 and 6 before being injected into the cabin 10 (if the system is in cooling mode).

an operating mode, referred to as an emergency mode, in which said inlet 4a of said power turbine 4 is supplied with said bleed air source 12 and the bleed air expanded by said power turbine 4 is cooled by the exchangers MHX and PHX in order to then directly supply said cabin 10 without passing through the air cycle turbine engine.

an operating mode, referred to as an intermediate mode, in which said inlet 4a of said power turbine is supplied with said bleed air source 12 in order to be able to rotate said compressor 3 supplied with fresh air 11 drawn from outside the aircraft, and said air compressed by said compressor 3 is mixed with the bleed air expanded by said power turbine 4 upstream of the primary circuit of the primary cooling exchanger. This mixed air is then either injected directly into the cabin, or dried after passing through the water extraction loop and the expansion turbines.

It should be noted that other operating modes are possible by control of the various control valves. These control valves are preferably controlled by a control unit on the basis of the flight conditions (altitude, outside temperature, flight status—ground, climb, landing, cruising flight—etc.) of the aircraft.

Figure 2:
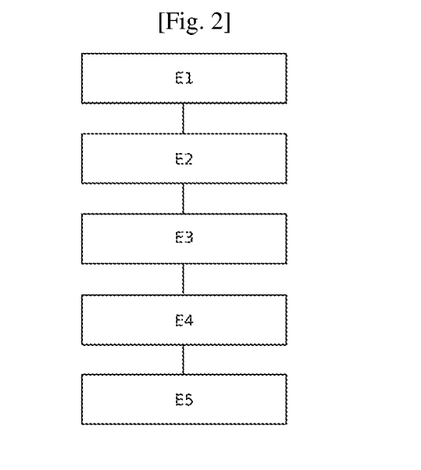
FIG. 2 is a schematic view of a method for air conditioning a cabin of an aircraft in accordance with one embodiment according to the invention.

FIG. 2 schematically illustrates a method for air conditioning a cabin 10 of an aircraft comprising a bleed air source 12, a fresh outside air source 11, a channel 13 for circulating ram air drawn from outside the aircraft, a primary cooling exchanger PHX which is accommodated in said ram-air circulation channel 13, a main cooling exchanger MHX which is accommodated in said ram-air circulation channel 13, an air cycle turbine engine comprising at least one compressor 3, a power turbine 4, a second turbine 5 and a third turbine 6 which are mechanically connected to one another by a mechanical shaft, and a network of pipes and control valves comprising the following steps:

a step E1 in which the bleed air is conveyed to said power turbine in order to make it possible for said compressor to be driven by said power turbine, a step E2 in which the fresh outside air is supplied to said compressor in order for said air to be compressed by said compressor, a step E3 in which the air compressed by said compressor is conveyed by said pipe network to said primary cooling exchanger PHX, then to said cabin after passing at least through a water extraction loop if the flight conditions so require, a step E4 in which the bleed air expanded by said power turbine is conveyed, on the basis of the flight conditions, either to the ram-air circulation channel upstream of the primary cooling exchanger, or to a manifold for mixing said bleed air with the air from said compressor, or directly to said cabin bypassing said main cooling exchanger, a step E5 in which the air discharged from the cabin, referred to as recovery air, is directed to an inlet of at least one turbine which is mechanically connected to said compressor and to said power turbine so as to form a pneumatic energy source for driving the air cycle turbine engine.

Figure 3:
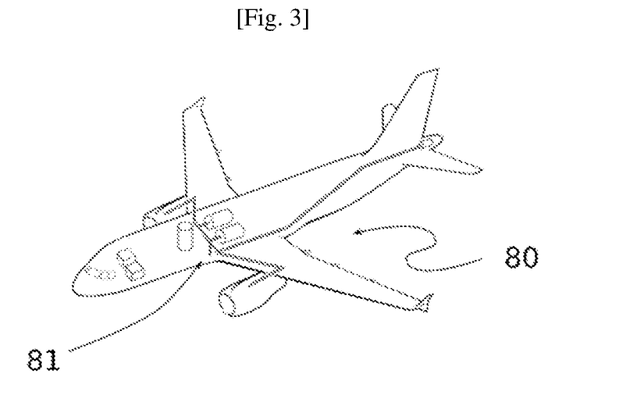
FIG. 3 is a schematic perspective view of an aircraft in accordance with one embodiment according to the invention.

FIG. 3 schematically illustrates an aircraft 80 provided with an air conditioning system 81 according to the invention.

The invention could also be applied to an air conditioning system of a rail transport vehicle, in which case the opening/closing conditions of the control valves (and in particular of the altitude valve) must be adapted to the operating conditions of the rail transport vehicle.

The invention claimed is:

1. An air conditioning system for a cabin of an air or rail transport vehicle comprising:
    a hot and pressurized air source, referred to as a bleed air source,
    a channel for circulating ram air drawn from outside the transport vehicle,
    a network of pipes and control valves which are configured to be able to control the flow of air circulating through said pipes on the basis of the conditions of use of the transport vehicle,
    an air cycle turbine engine comprising at least one compressor and a turbine, referred to as a power turbine, which are mechanically connected to one another, said compressor comprising an air inlet which is fluidically connected to an opening for drawing in outside air and an air outlet which is suitable for being able to be fluidically connected by said pipe network, upon control of at least one control valve, to said cabin in order to be able to supply it with air at a controlled pressure and temperature, and said power turbine comprising an air inlet which is suitable for being able to be fluidically connected by said pipe network, upon control of at least one control valve, to said bleed air source and an air outlet,
    at least one heat exchanger, referred to as a primary cooling exchanger (PHX), which is accommodated in said ram-air circulation channel and comprises a primary circuit which is supplied with the flow of air from said compressor in thermal interaction with a secondary circuit supplied with said ram air
    wherein said pipe network further comprises a pipe, referred to as a thermal power pipe, which is suitable for being able to fluidically connect, upon control of at least one control valve, said air outlet of said power turbine and said ram-air circulation channel upstream of said primary exchanger (PHX) such that said bleed air expanded by said power turbine can form a thermal energy source for said ram air being supplied to said primary circuit of said primary exchanger (PHX), and further comprising at least a second heat exchanger, referred to as a main cooling exchanger (MHX), which is arranged in said ram-air circulation channel upstream of said thermal power pipe and comprises a primary circuit supplied with said flow of air from said primary circuit of said primary exchanger (PHX) in thermal interaction with a secondary circuit supplied with said ram air.

2. The air conditioning system according to claim 1, wherein said pipe network further comprises a bypass pipe which is suitable for being able to fluidically connect, upon control of at least one control valve, the outlet of the primary circuit of said primary cooling exchanger (PHX) and the pipe network downstream of said main cooling exchanger (MHX) so as to bypass said main cooling exchanger.

3. The air conditioning system according to claim 2, wherein said control valves are controlled in order to allow the following operating modes comprising:
    a routine mode, in which said inlet of said power turbine is supplied with said bleed air source in order to be able to rotate said compressor supplied with air drawn from outside of the transport vehicle, and said air outlet of said power turbine supplies said ram-air channel with expanded bleed air,
    an emergency mode, in which said bleed air source is supplied directly to said cabin after cooling by said heat exchangers (MHX, PHX) accommodated in the ram-air circulation channel, without passing through the air cycle turbine engine,
    an intermediate mode, in which said inlet of said power turbine is supplied with said bleed air source in order to be able to rotate said compressor supplied with air drawn from outside the transport vehicle, and said air compressed by said compressor is mixed with the bleed air expanded by said power turbine upstream of the primary circuit of the primary cooling exchanger (PHX) or with bleed air directly from said bleed air source.

4. The air conditioning system according to claim 1, further comprising a turbofan which is arranged in said ram-air circulation channel downstream of said primary exchanger (PHX) and suitable for being able to be connected by said pipe network, upon control of at least one control valve, to said bleed air source.

5. The air conditioning system according to claim 1, wherein said air cycle turbine engine further comprises:
    at least a second turbine which is mechanically connected to said compressor and to said power turbine, said second expansion turbine comprising at least a first air inlet which is suitable for being able to be fluidically connected by said pipe network, upon control of at least one control valve, to said main cooling exchanger (MHX) and an air outlet which is suitable for being able to be fluidically connected by said pipe network, upon control of at least one control valve, to said cabin,
    a water extraction loop which is arranged between said main cooling exchanger (MHX) and said second turbine so as to be able to extract the water present in the air fed by said main cooling heat exchanger before being fed to this second expansion turbine.

6. The air conditioning system according to claim 5, wherein said second expansion turbine comprises at least a second air inlet which is suitable for being able to be fluidically connected by said pipe network, upon control of at least one control valve, to an air outlet of said cabin, referred to as a recovery air outlet, such that this recovery air discharged from said cabin can form a pneumatic energy source for driving said second turbine.

7. The air conditioning system according to claim 6, further comprising at least one heat exchanger, referred to as an intercooler, comprising a primary circuit which is suitable for being able to be fluidically connected by said pipe network, upon control of at least one control valve, to said recovery air outlet of said cabin and to said second inlet of said second expansion turbine, in thermal interaction with a secondary circuit which is suitable for being able to be fluidically connected by said pipe network to said air outlet of said compressor and to said primary cooling exchanger (PHX) or to said pipe network downstream of said main cooling exchanger (MHX).

8. The air conditioning system according to claim 5, wherein said air cycle turbine engine further comprises at least one third turbine which is mechanically connected to said compressor, to said power turbine and to said second expansion turbine, said third turbine comprising a first air inlet which is suitable for being able to be fluidically connected by said pipe network, upon control of at least one control valve to said air outlet of said second turbine and an air outlet which is suitable for being able to be fluidically connected by said pipe network, upon control of at least one control valve, to said cabin.

9. The air conditioning system according to claim 8, wherein said third expansion turbine comprises at least a second air inlet which is suitable for being able to be fluidically connected by said pipe network, upon control of at least one control valve, to said recovery air outlet such that this recovery air discharged from said cabin can form a pneumatic energy source for driving said third turbine.

10. The air conditioning system according to claim 7, wherein said intercooler comprises a primary circuit which is suitable for being able to be fluidically connected by said pipe network, upon control of at least one control valve, to said recovery air outlet of said cabin and to said second inlets of said second and third expansion turbines, in thermal interaction with a secondary circuit which is suitable for being able to be fluidically connected by said pipe network to said air outlet of said compressor and to said primary cooling exchanger (PHX) or to said pipe network downstream of said main cooling exchanger (MHX).

11. An aircraft comprising:
a cabin, and
an air conditioning system, said air conditioning system supplying said cabin of the aircraft with conditioned air, said system comprising:
a hot and pressurized air source, referred to as a bleed air source,
a channel for circulating ram air drawn from outside the transport vehicle,
a network of pipes and control valves which are configured to be able to control the flow of air circulating through said pipes on the basis of the conditions of use of the transport vehicle,
an air cycle turbine engine comprising at least one compressor and a turbine, referred to as a power turbine, which are mechanically connected to one another, said compressor comprising an air inlet which is fluidically connected to an opening for drawing in outside air and an air outlet which is suitable for being able to be fluidically connected by said pipe network, upon control of at least one control valve, to said cabin in order to be able to supply it with air at a controlled pressure and temperature, and said power turbine comprising an air inlet which is suitable for being able to be fluidically connected by said pipe network, upon control of at least one control valve, to said bleed air source and an air outlet,
at least one heat exchanger, referred to as a primary cooling exchanger (PHX), which is accommodated in said ram-air circulation channel and comprises a primary circuit which is supplied with the flow of air from said compressor in thermal interaction with a secondary circuit supplied with said ram air,
wherein said pipe network further comprises a pipe, referred to as a thermal power pipe, which is suitable for being able to fluidically connect, upon control of at least one control valve said air outlet of said power turbine and said ram-air circulation channel upstream of said primary exchanger (PHX) such that said bleed air expanded by said power turbine can form a thermal energy source for said ram air being supplied to said primary circuit of said primary exchanger (PHX), and
further comprising at least a second heat exchanger, referred to as a main cooling exchanger (MHX), which is arranged in said ram-air circulation channel upstream of said thermal power pipe and comprises a primary circuit supplied with said flow of air from said primary circuit of said primary exchanger (PHX) in thermal interaction with a secondary circuit supplied with said ram air.

12. A method for air conditioning a cabin of an aircraft comprising a hot and pressurized air source, referred to as a bleed air source, a fresh outside air source, a channel for circulating ram air drawn from outside the aircraft, a cooling exchanger, referred to as a primary exchanger (PHX), which is accommodated in said ram-air circulation channel, a cooling exchanger, referred to as a main exchanger (MHX), which is accommodated in said ram-air circulation channel, an air cycle turbine engine comprising at least one compressor and a power turbine which are mechanically connected to one another, and a network of pipes and control valves, characterized in that it comprises the following steps:
(E1) the bleed air is conveyed to said power turbine in order to make it possible for said compressor to be driven by said power turbine,
(E2) the fresh outside air is supplied to said compressor in order for said air to be compressed by said compressor,
(E3) the air compressed by said compressor is conveyed by said pipe network to said primary cooling exchanger (PHX), then to said cabin after at least passing through a water extraction loop if the flight conditions so require,
(E4) the bleed air expanded by said power turbine is conveyed, on the basis of the flight conditions, either to the ram-air circulation channel upstream of the primary cooling exchanger, or to a manifold for mixing said bleed air with the air from said compressor, or directly to said cabin bypassing said main cooling exchanger.

13. The method for air conditioning a cabin of an aircraft according to claim 12, further comprising a step (E5) consisting in conveying air discharged from the cabin, referred to as recovery air, to an inlet of at least one turbine which is mechanically connected to said compressor and to said power turbine so as to form a pneumatic energy source for driving the air cycle turbine engine.

* * * * *